(12) United States Patent
Kim et al.

(10) Patent No.: US 7,301,960 B2
(45) Date of Patent: Nov. 27, 2007

(54) APPARATUS FOR AND METHOD OF CONTROL AND COMMUNICATION OF MULTIPLE STATIONS IN A TDM NETWORK

(75) Inventors: Junius A. Kim, Boxborough, MA (US); Charles E. Alexander, Pepperell, MA (US)

(73) Assignee: Harris Corporation, Melbourne, FL (US)

( * ) Notice: Subject to any disclaimer, the term of this patent is extended or adjusted under 35 U.S.C. 154(b) by 545 days.

(21) Appl. No.: 09/737,510

(22) Filed: Dec. 15, 2000

(65) Prior Publication Data

US 2002/0075890 A1 Jun. 20, 2002

(51) Int. Cl.
*H04L 12/43* (2006.01)
*H04J 3/12* (2006.01)

(52) U.S. Cl. .................. 370/458; 370/523; 370/527

(58) Field of Classification Search .............. 370/314, 370/321, 324, 336, 337, 345, 442, 450, 452, 370/458, 466, 468, 498, 503, 508, 509, 522, 370/527, 529, 539, 541, 459; 709/208, 230, 709/232

See application file for complete search history.

(56) References Cited

U.S. PATENT DOCUMENTS

| | | | | |
|---|---|---|---|---|
| 4,566,094 A | * | 1/1986 | Ardon et al. | 370/376 |
| 5,206,857 A | * | 4/1993 | Farleigh | 370/452 |
| 5,241,543 A | * | 8/1993 | Amada et al. | 370/509 |
| 5,337,306 A | * | 8/1994 | Hall | 370/249 |
| 5,602,841 A | * | 2/1997 | Lebizay et al. | 370/413 |
| 5,684,806 A | * | 11/1997 | Akiyama | 370/522 |
| 5,768,282 A | * | 6/1998 | Ohara et al. | 370/506 |
| 5,828,670 A | * | 10/1998 | Narasimha et al. | 370/516 |
| 5,878,044 A | * | 3/1999 | Frischknecht et al. | 370/466 |
| 5,935,214 A | * | 8/1999 | Stiegler et al. | 709/238 |
| 6,108,346 A | * | 8/2000 | Doucette et al. | 370/450 |

(Continued)

FOREIGN PATENT DOCUMENTS

EP 001041743 A2 * 4/2000

OTHER PUBLICATIONS

RFL Electronics, Inc., The IMUX 2000E, Revised Dec. 1, 2000, Publication No. PI2000, 55 pages.

(Continued)

*Primary Examiner*—Wing Chan
*Assistant Examiner*—Gregory Sefcheck
(74) *Attorney, Agent, or Firm*—Tarolli, Sundheim, Covell & Tummino LLP

(57) ABSTRACT

A system for transmitting and receiving control data in a TDM communications network includes a single master TDM multiplexor and one or more slave TDM muliplexors. The master station stimulates the one or more slave stations, and only one station can transmit control data at any given time. Both slave and master TDM multiplexors include (i) a receiver component for extracting control data from the TDM signal and passing this control data to a control processor; (ii) a transmitter component for inserting control data from a control processor into the TDM signal; and (iii) a bridging component for passing control data along to the next TDM multiplexor without the need for control processor intervention. The system allows a single node in the network to communicate with and control all the nodes in the network. The system can control other TDM sub-networks using secondary communication links.

19 Claims, 7 Drawing Sheets

U.S. PATENT DOCUMENTS 6,188,699 B1 * 2/2001 Lang et al. .................. 370/463
6,278,718 B1 * 8/2001 Eschholz .................... 370/503
6,356,559 B1 * 3/2002 Doucette et al. ............ 370/450
6,370,159 B1 * 4/2002 Eidson ....................... 370/503

OTHER PUBLICATIONS

RFL Electronics, Inc., IMUX 2000E, Revised Jul. 1, 1999, Publication No. PI2000, 38 pages.

* cited by examiner

APPARATUS FOR AND METHOD OF CONTROL AND COMMUNICATION OF MULTIPLE STATIONS IN A TDM NETWORK

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to time division multiplexed (TDM) communication systems, and more particularly, to control of such TDM systems via communications channels existing between multiple stations in a TDM network.

TDM systems provide a convenient method of transporting multiple channels of digital data via a single physical link. T1 and E1 are two exemplary TDM protocols well known to those in the art. The simplest form of a TDM communication system is a point to point system 10 with two TDM multiplexors 12 electrically coupled by some physical media 14 (e.g., an electrical cable), as shown in FIG. 1. Each TDM multiplexor can receive N discrete channels of channel data and transmit those channels in time-multiplexed slots arranged within consecutive frames. Further, each TDM multiplexor can receive transmitted frames and "de-multiplex" the data within the time-slots and distribute that data to the proper discrete channels. TDM multiplexors may also be used to form complex meshed networks combining ring and star topologies. Network access components such as multi-port switches and digital cross connect servers utilize TDM multiplexing functions to implement more complex network topologies.

Control of these access components within such networks is typically accomplished by connecting a personal computer or other terminal device 16 to a control port 18 on each access component via a standard communications link such as Ethernet, RS-232 or RS-485. Further, several co-located access components may be daisy-chained together by electrically coupling the respective control ports, thus providing a single access point for control management access.

One disadvantage to providing control to networked access components in this manner is the associated complication and expense, since each access component must include circuitry necessary to implement the interface to the standard communication link. Further, each terminal device 16 must be coordinated so that the control parameters are consistent throughout the network.

Another disadvantage to providing control to networked access components in this manner is the limited extendibility, since standard protocols such as Ethernet, RS-232 or RS-485 typically specify maximum transmission path lengths. Although implementing "repeater" stations in the control path can mitigate this extendibility problem, such repeaters increase the overall expense of the system.

It is an object of the present invention to substantially overcome the above-identified disadvantages and drawbacks of the prior art.

SUMMARY OF THE INVENTION

The foregoing and other objects are achieved by the invention which in one aspect comprises a system for transmitting and receiving control data in a TDM communication network. The system includes a single master control source for providing the control data, and one or more slave TDM multiplexors within the TDM communications network, communicating via a TDM signal. Each of the slave TDM multiplexors includes a transmitter component for accepting the control data from the master control source, and inserting the control data into the TDM signal. Each multiplexor also includes a receiver component for extracting the control data in the TDM signal and passing the control data to a local control processor, and a bridging component for passing control data along to the next TDM multiplexor, independent of the local control processor.

In another embodiment, the transmitter component of each of the one or more slave TDM multiplexors receives the control data from the associated receiver component, inserts the control data into the TDM signal, and transmits the TDM signal to one or more TDM multiplexors.

In another embodiment, the transmitter component of each of the one or more slave TDM multiplexors inserts the control data into one or more time slots of the TDM signal. The associated receiver component extracts the control data from the corresponding one or more time slots of the TDM signal.

In another embodiment, the transmitter component of each of the one or more slave TDM multiplexors inserts the control data into a fraction of a time slot of the TDM signal. The associated receiver component extracts the one or more control signals from the corresponding fraction of the corresponding time slot of the TDM signal.

In another embodiment, the TDM communications network includes one or more T1 communications links.

In another embodiment, the TDM communications network includes one or more E1 communications links.

In another embodiment, the TDM communications network is coupled to a second TDM communications network via a secondary communications link, so as to create a sub-network to the TDM communications network.

In another embodiment, the secondary communications link includes an Ethernet communications link.

In another embodiment, the secondary communications link includes an RS-485 communications link.

In another embodiment, the secondary communications link includes an RS-232 communications link.

In another embodiment, the control data network operates in a half duplex mode.

In another embodiment, the first TDM multiplexor operates as a master station, and the remaining TDM multiplexors operate as slave stations. The slave stations transmit only when stimulated by the master station, and only one slave station transmits at any given time.

In another embodiment, the control port includes an Ethernet communications port for communicating with the master control source via an Ethernet protocol.

In another embodiment, the control port includes an RS-232 communications port for communicating with the master control source via an RS-232 protocol.

In another embodiment, the control port includes an RS-485 communications port for communicating with the master control source via an RS-485 protocol.

In another embodiment, the receiver component performs a serial to parallel conversion of the control data, bit shifts the control data so as to form one or more control data octets, and buffers the control data octets for use by the control processor.

In another embodiment, the transmitter component buffers control data octets from the master control source, performs a parallel to serial conversion of the control data, and inserts the control data into predetermined data positions of the TDM signal.

In another embodiment, the TDM communications network includes terminal multiplexors.

In another embodiment, the TDM communications network includes drop-insert multiplexors.

In another aspect, the invention comprises a method of distributing control data in a TDM communications network, from a master control source to two or more TDM multiplexors within the TDM communications network. The method includes receiving one or more control signals from the master control source. The method further includes inserting the one or more control signals into the TDM signal at the first TDM multiplexor, extracting the control signals from the TDM signal at each of the remaining TDM multiplexors, and providing the control signals to an associated TDM multiplexor control processor.

In another embodiment, the method further includes receiving the one or more control signals from the receive interface device at each of the remaining TDM multiplexors, inserting the one or more control signals into the TDM signal, and transmitting the TDM signal to one or more TDM multiplexors.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
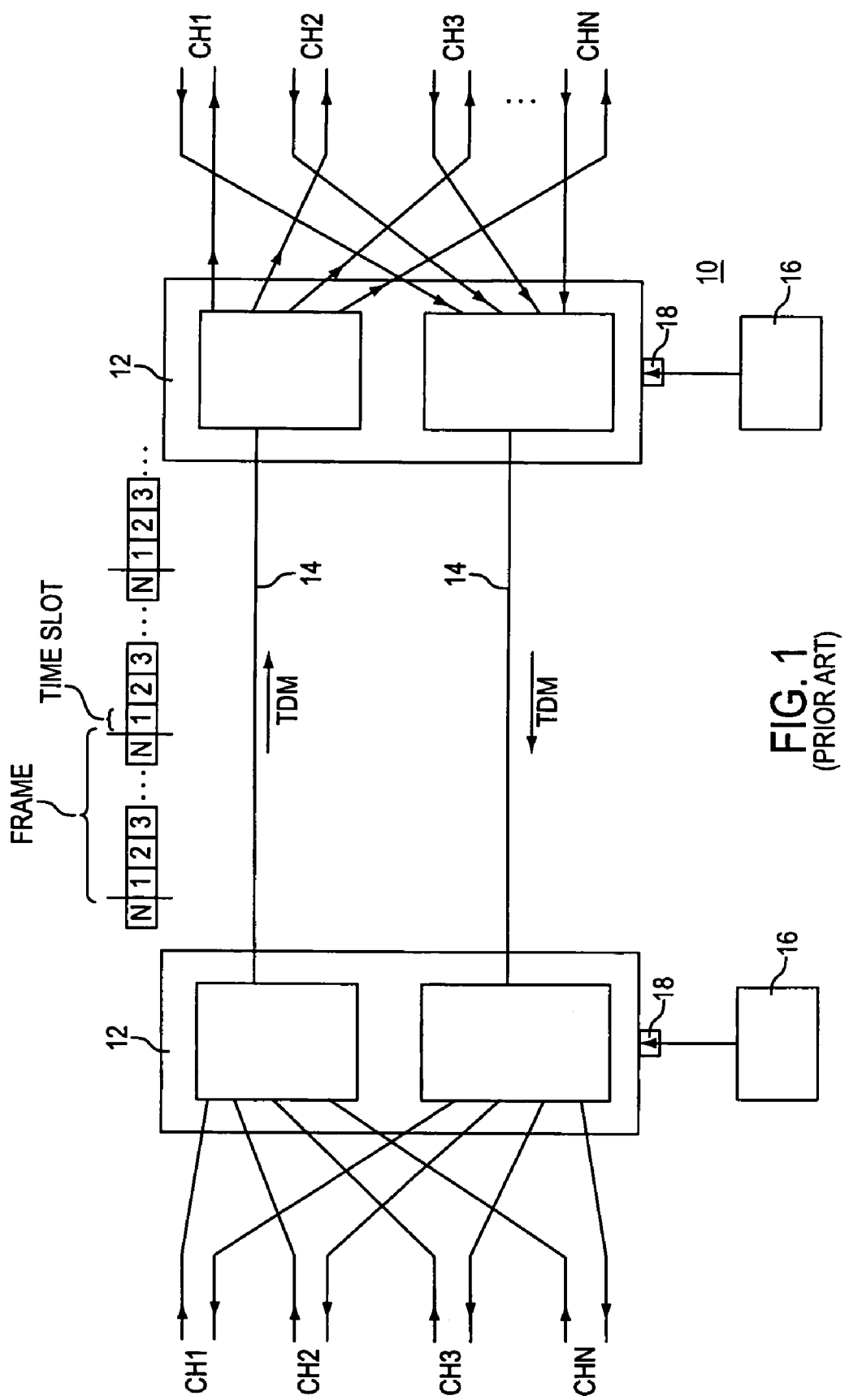
FIG. 1 shows a prior art point to point TDM communication system with two TDM multiplexors electrically coupled by some physical communications link.
Figure 2:
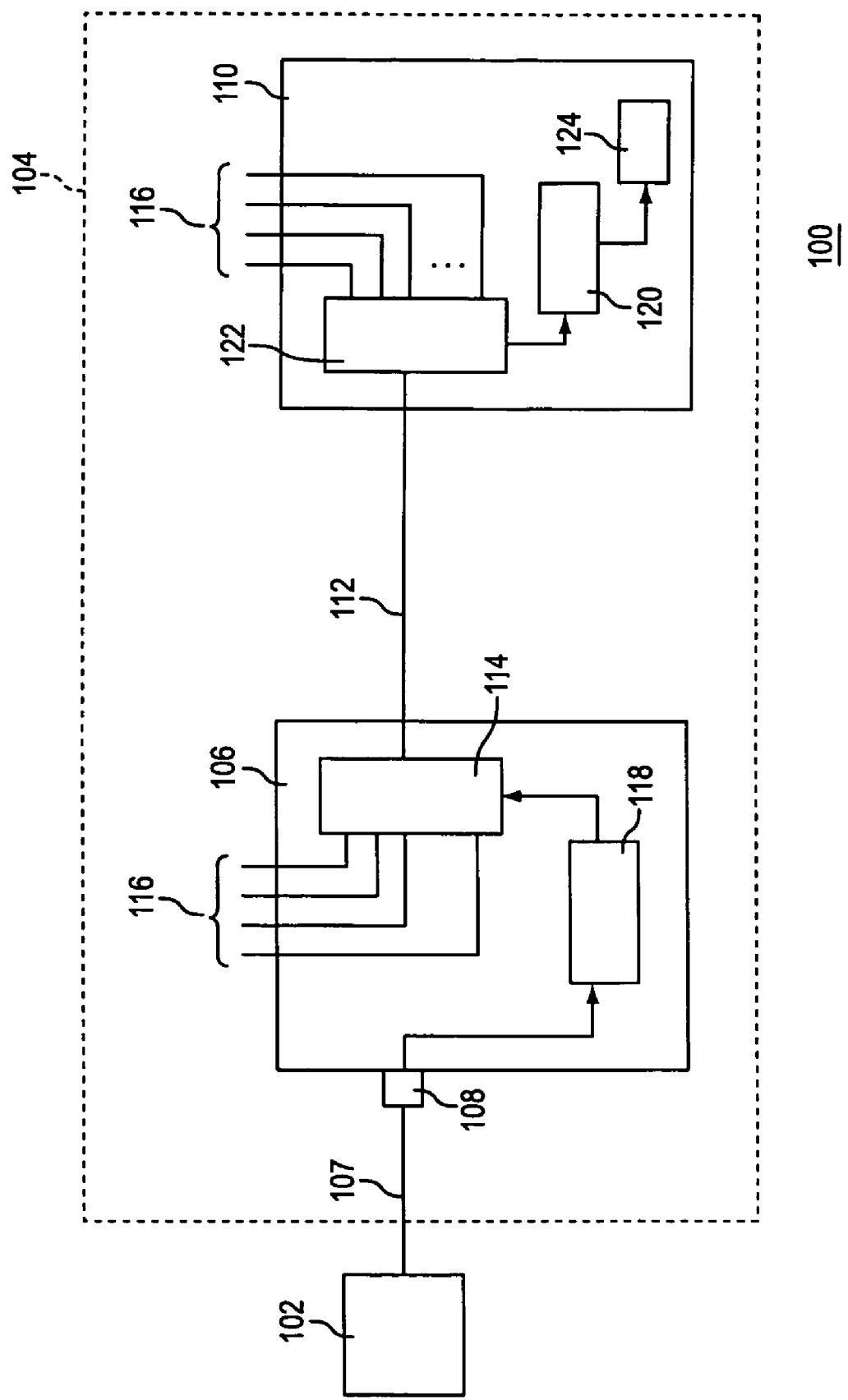
FIG. 2 shows a block diagram view of one preferred embodiment of a control data distribution system for distributing control data in a TDM communications network.

FIG. 2 shows a block diagram view of one preferred embodiment of a control data distribution system 100 for distributing control data in a TDM communications network. In one preferred embodiment, the TDM communications network includes TDM multiplexors (also referred to herein as "stations") connected via dedicated T1 links, although other embodiments may include multiplexors connected with other TDM protocols known in the art, such as E1. One preferred data link layer protocol includes synchronous data link control (hereinafter "SDLC"), although other data link protocols known in the art may also be used. An SDLC network is made up of a primary, or master, station that controls all communications, and one or more secondary, or slave, stations. Multiple slaves connected to a single master is referred to as "multi-point" or "multi-drop" network. The control data (also referred to herein as control signals) originates at a master control source 102 and is distributed to two or more TDM multiplexors within the TDM communications network 104. A first TDM multiplexor 106 within the network 104 receives the control data as one or more control signals from the master control source via a control communications link 107, through a control port 108. The communications link 107 is preferably suitable for transmitting the control signals via a standard communications protocol such as Ethernet, RS-232 or RS-485. Other communications protocols known in the art may also be used to convey the control signals. Regardless of the original form of the control data (i.e., digital, analog, or various forms or combinations thereof known to those in the art), the multiplexor 106 converts the control signals to a digital format compatible with the TDM protocol being used.

The first TDM multiplexor 106 is electrically coupled to a second TDM multiplexor 110 within the network 104, via a transmission line 112 that is capable of supporting a TDM signal. A TDM signal generator 114 within the first TDM multiplexor receives channel data 116 from local data sources, organizes it and inserts it into appropriate time slots so as to generate a TDM signal. The first TDM multiplexor 106 further includes a transmit interface device 118 in the first TDM multiplexor 106 for receiving the one or more control signals from the control port 108, and inserting the control signals into appropriate time position within the TDM signal. In the embodiment shown in FIG. 2, the transmit interface device 118 (also referred to herein as a transmitter component) cooperates with the TDM signal generator 114 to insert the control data into the TDM signal, although in other embodiments, the transmit interface device 118 may operate independent of the TDM signal generator 114 to insert the control data into the TDM signal.

In one embodiment, the transmit interface device 118 inserts the control data into full DS0 time slot that is dedicated to the control signals. In another embodiment, the transmit interface device 118 inserts the control data into multiple DS0 time slots dedicated to the control signals. In yet another embodiment, the transmit interface device 118 inserts the control data into some fraction of a DS0 time slot. In this case, the remainder of the time not used by the control signals may be shared with another data source The first TDM multiplexor 106 transmits the TDM signal to the second TDM multiplexor 110. The second TDM multiplexor 110 includes a receive interface device 120 (also referred to herein as a receiver component) for extracting the control signals from the TDM signal. The second TDM multiplexor 110 further includes a TDM receiver 122 for receiving the TDM signal and extracting the channel data 116 from the TDM signal and distributing the channel data 116 to the appropriate local destinations. In the embodiment shown in FIG. 2, the receive interface device 120 cooperates with the TDM receiver 122 to extract the control data from the TDM signal, although in other embodiments, the receive interface device 120 may operate independent of the TDM receiver 122 to extract the control data from the TDM signal. The receive interface device 120 distributes the control signals it extracts from the TDM signal and provides the control signals to an associated TDM multiplexor control processor 124. In prior art systems, the control signals would have been provided directly from the master control source 102 (or a local version of the master control source) to the TDM multiplexor control processor 124, through a control port on the second TDM multiplexor and via a standard protocol such as Ethernet, RS-232 or RS-485.

The system shown in FIG. 2 depicts data flow from the first TDM multiplexor 106 to the second TDM multiplexor 110 only. Those skilled in the art will recognize that generally such a TDM link provides for bi-directional communication, either half or full duplex, although the components necessary for bi-directional communication are not shown in FIG. 2. In all of the descriptions herein, it is understood that bi-directional capabilities may be present, even if not explicitly shown.

Figure 3:
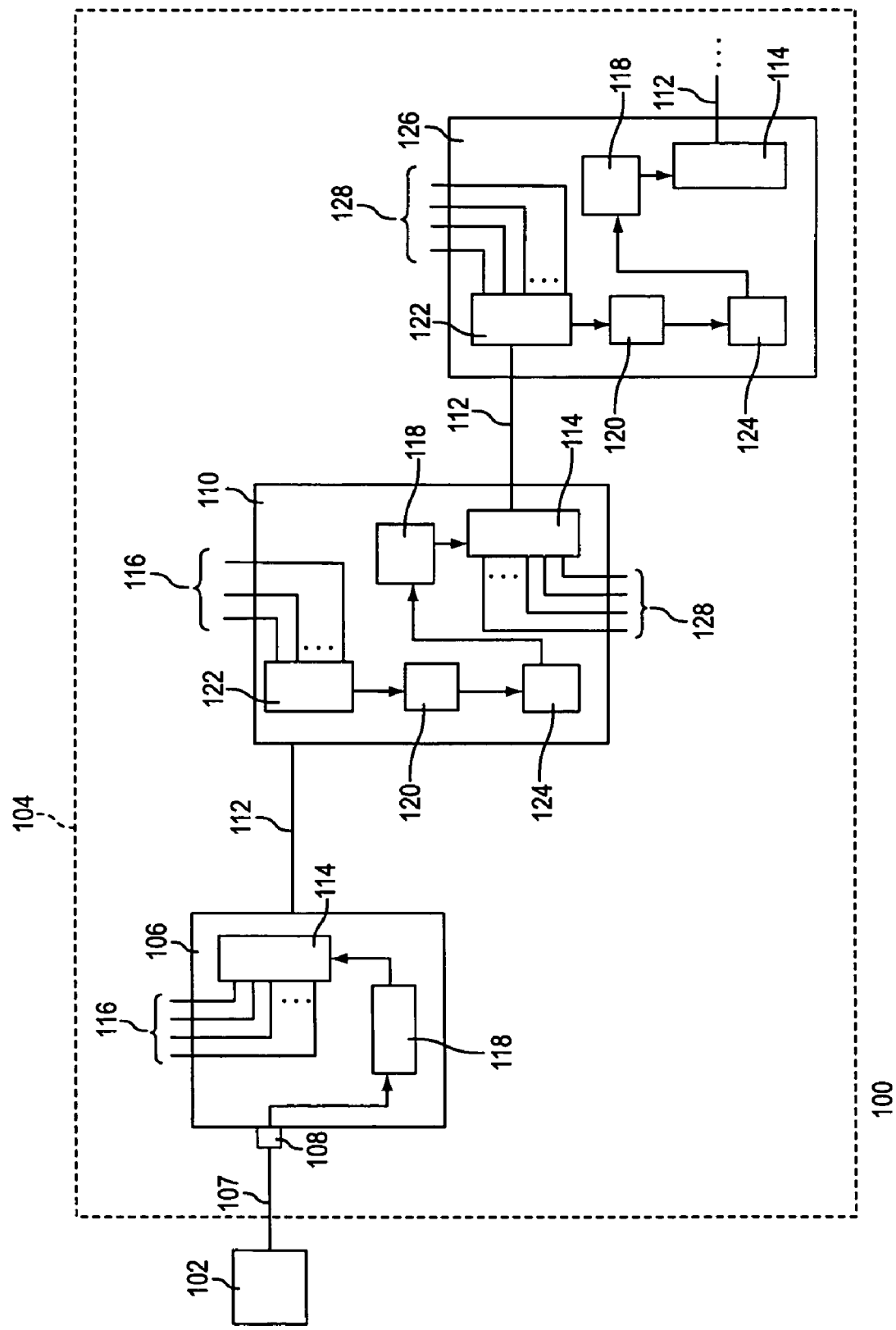
FIG. 3 shows a block diagram view of another embodiment of the system of FIG. 2, including a third multiplexor.

In the embodiment of the invention shown in FIG. 3, the second TDM multiplexor 110 may further include a transmit interface device 118 for relaying the control signals received from the first TDM multiplexor 106 to a third TDM multiplexor 126. The third TDM multiplexor 126 includes the components shown in the second TDM multiplexor 110, e.g., a TDM receiver 122 for receiving the TDM signal and extracting the a second set of channel data 128 from the TDM signal and distributing the channel data 128 to the appropriate local destinations, and a receive interface device 120 for extracting the control signals from the TDM signal. In this embodiment, the second TDM multiplexor functions as a 'repeater' for the control data, passing along the control data from the first TDM multiplexor 106 to the third TDM multiplexor 126, while tapping off the control data for use by the local controller 124 that resides within the second TDM multiplexor 110. In essence, the second TDM multiplexor bridges the control data from the TDM receiver 122 to the TDM signal generator 114. The third TDM multiplexor 126 may also a transmit interface device 118 for relaying the control signals received from the second TDM multiplexor 106 to a fourth TDM multiplexor (not shown). This pattern may be repeated through many TDM multiplexor stations, such that the control data from the master control source 102 propagates to all of the multiplexor stations in the chain, while using only the link resources present for the primary mission of the system (i.e., communicating channel data).

The invention described herein may also be used to form a communications architecture with one or more sub-networks associated with a main network as described in FIG. 3.

Figure 4:
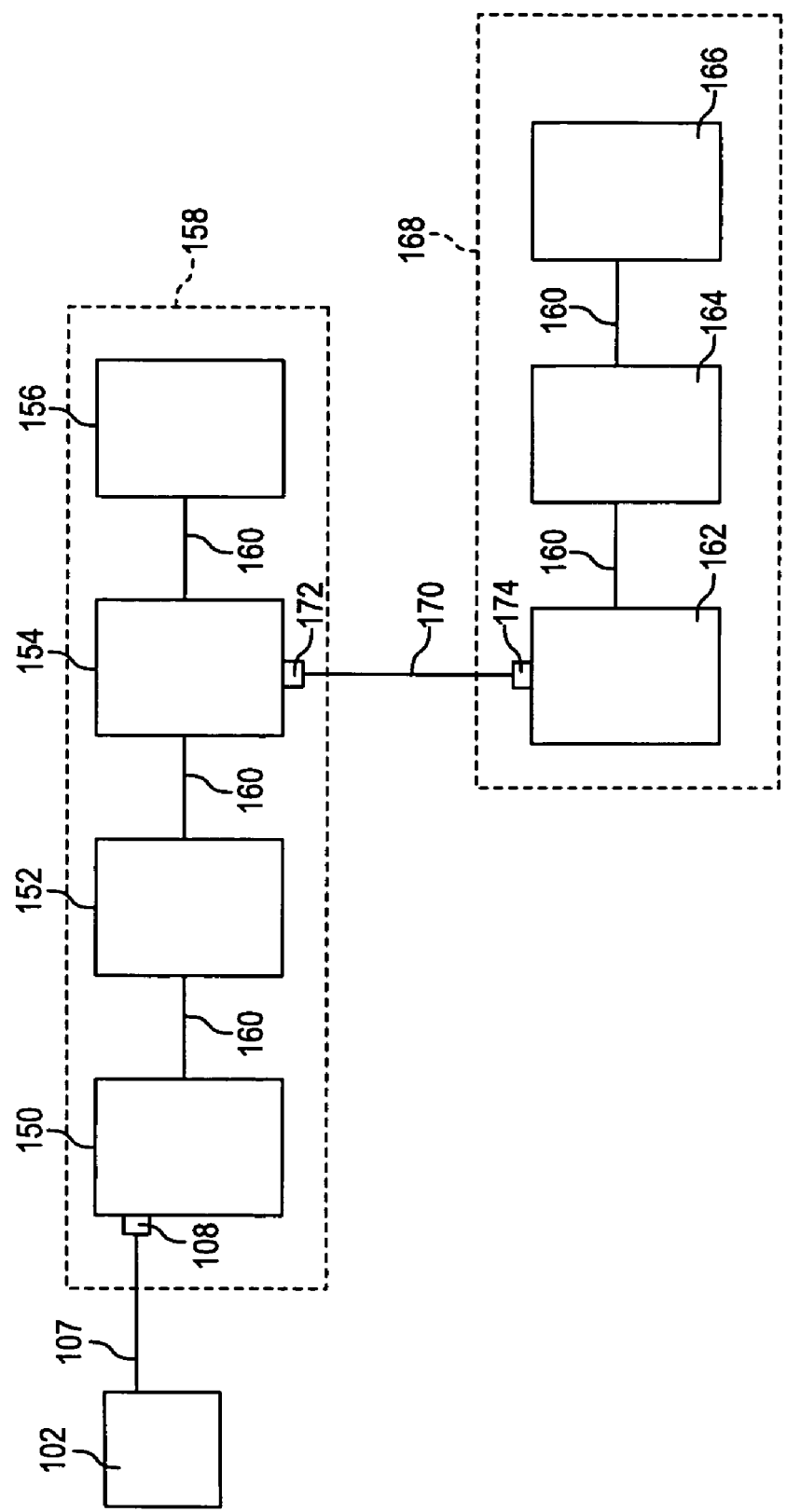
FIG. 4 shows a block diagram view of the system of FIG. 2, including a sub-network linked to a primary network.

FIG. 4 shows such an architecture having four multiplexors 150, 152, 154, 156 connected together in a primary TDM network 158 via a series of TDM links 160. FIG. 4 further shows three multiplexors 162, 164, 166 connected together in a secondary TDM network 168 (also referred to herein as "sub-network") via a series of TDM links 160. The multiplexors 150, 152, 154, 156, 162, 164, 166 and the TDM links 160 are all preferably identical to the corresponding components described in FIGS. 2 and 3. The primary network 158 and the secondary network 168 are electrically coupled via an inter-network link 170. The inter-network link 170 is a standard communications link 168, similar to the control communications link 107 used to convey the control data from the master control source 102 to the first TDM multiplexor 106, described herein. The inter-network link 170 connects a control port 172 on the third TDM multiplexor 154 in the primary network 158, to a control port 174 on the first TDM multiplexor 162 in the secondary network 168, although other combinations of TDM multiplexors from their respective networks may also be used to connect the primary network 158 to the secondary network 168. Using this general architecture to connect one network to another network for the purposes of distributing control data, an unlimited number of stations or sub-networks can be coupled together.

Figure 5:
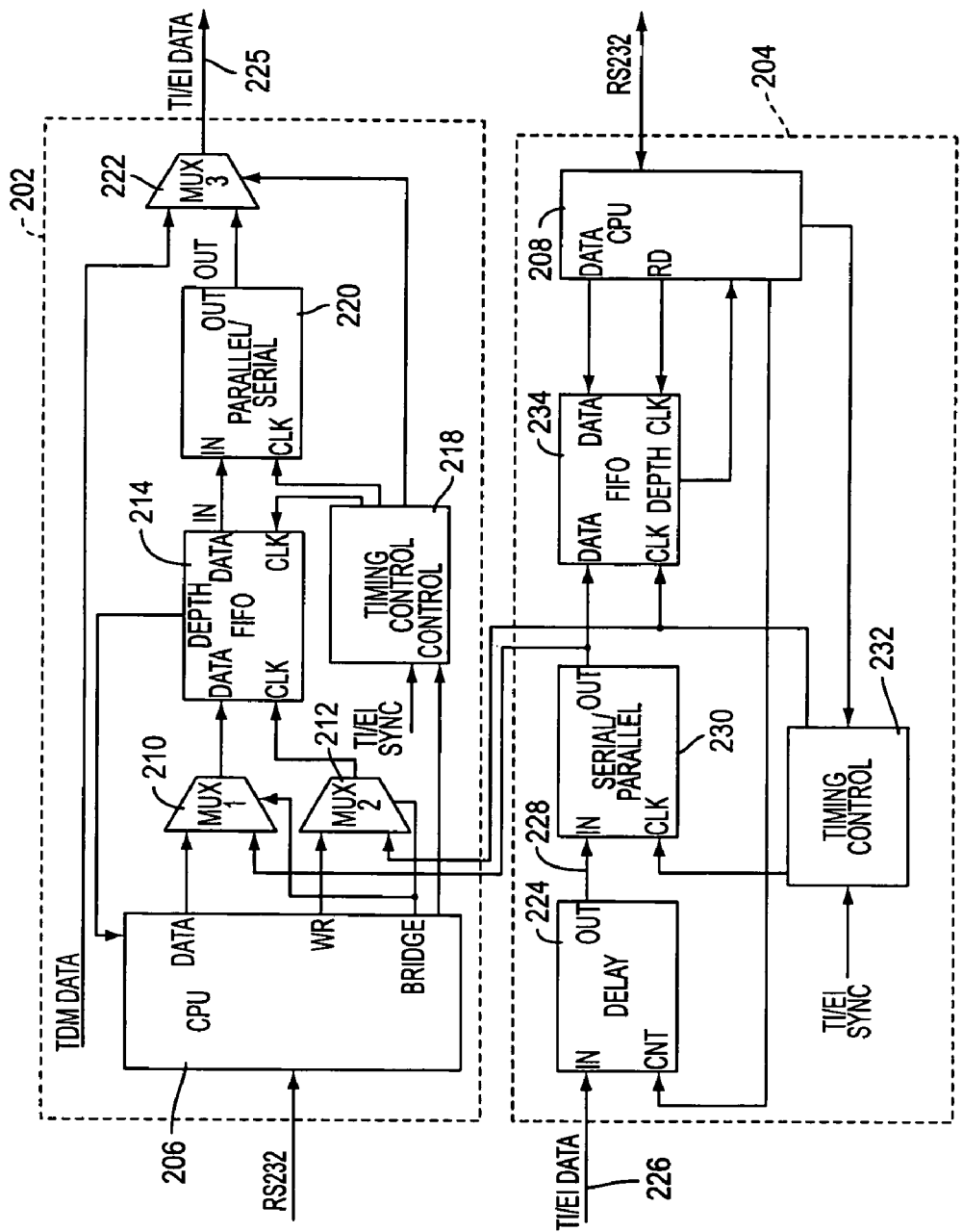
FIG. 5 shows a block diagram of the components used to implement one embodiment of the control data distribution systems of FIGS. 2 and 3.

FIG. 5 shows a block diagram of the components used to implement one embodiment 200 of the control data distribution systems of FIGS. 2 and 3. The system 200 includes a transmitter 202 (also referred to herein as "transmitter component") and a receiver 204 (also referred to herein as "receiver component"), that correspond collectively to a station such as the second TDM multiplexor 110 shown in FIG. 3. A transmit processor 206 (also referred to herein as "CPU") controls the transmitter 202, receives control data via a standard communication protocol (e.g., RS-232) from a control source, and inserts the control data into the outgoing TDM stream 225. A receive processor 208 controls the receiver 204, extracts control data from the incoming TDM stream 226, and transmits control data via a standard communication protocol (e.g., RS-232) to local associated network components. In some embodiments, the processors 206 and 208 are implemented with separate processors; in other embodiments, the processors 206 and 208 are implemented within a single processor, even though in FIG. 5 they are depicted conceptually as separate processors. The processor may include a microprocessor, a microcontroller, a state machine, or other processing device known in the art.

In the operation of the transmitter 202, when the transmit processor 206 initiates transmit communication data, it switches a first multiplex element 210 and a second multiplex element 212 to write octet data into the transmit FIFO 214. A transmit timing control circuit 218 is synchronized to the TDM framing of the outgoing TDM stream 225. The timing control circuit 218 clocks data from the FIFO 214 and into a parallel-to-serial converter 220. The timing control circuit 218 controls a third multiplexor 222 to multiplex the communication serial bit stream from the converter 220 into the outgoing T1/E1 data stream. The timing control circuit 218 can multiplex data into any DS0 in the TDM data stream for any number of bits per frame, so that the communication data rate and frame position are flexible. The processor 206 can read the depth of the FIFO 214; when the FIFO 214 is close to being emptied, the processor 206 writes data to the FIFO 214 to prevent an underflow condition. The average data rate must remain constant so as to prevent overflow or underflow in the FIFO 214.

In the operation of the receiver 204, a programmable serial delay circuit 224 receives a received T1/E1 data stream 226. The receive processor 208 controls the amount of delay in the delay circuit 224. The delayed serial bit stream 228 is converted into parallel octet data via a serial-to-parallel converter 230 that is controlled by a receive timing control circuit 232. The timing control circuit 232 can clock any DS0 for any number of bits per frame, so the communication data rate and frame position are flexible. The octet data from the serial to parallel converter 230 is clocked into a receive FIFO 234, and the processor 208 reads the octets from the output of the FIFO 234. The processor 208 reads the depth of the FIFO 234, and will continue to read data when the FIFO 234 is near full to prevent an overflow condition.

The communication data can be on any DS0 for any number of bits. The flexible timing circuits 218, 232 can be programmed by the processors to insert/extract the communication bit stream anywhere in the T1/E1 frame for any number of bits. Since the number of bits per frame can be less than an octet, the receiver may not be in octet-alignment at any given time; thus, the receiver must be capable of acquiring octet alignment. The processor 208 analyzes the communication bit stream to detect the octet boundaries, and programs the serial delay circuit 224 to offset the bit stream 228 to ensure that the converter 230 writes octet-aligned data into the FIFO 234. This reduces the processing load on the processor 208, since the processor does not have to continually shift the octet data from the output of the FIFO 234.

The processors can bridge (connect) the receiver 204 directly to the transmitter 202 using the first multiplexor 210 and the second multiplexor 212. The first multiplexor 210 and the second multiplexor 212 (along with the associated electrical conductors that couple these multiplexors to the receiver 204 and the transmitter 202) are referred to herein collectively as the "bridging component." When bridging, the incoming communication data stream 226 is regenerated and transmitted back out, while the processor 208 continues to read the incoming communication information. While bridging, the FIFOs provide "elasticity" to the incoming and outgoing T1/E1 data streams, so that the data streams do not need to be synchronized in either frequency or frame position with respect to one another. If the T1/E1 data rates are different (incoming relative to outgoing), then the transmit FIFO 214 will eventually overflow or underflow. An overflow or underflow condition does result in a temporary loss of continuity of the communication data stream, but in practice such an interruption is brief, due to the fact that the data rates differ from one another by a small amount. While in this bridging mode, the path of the data communications runs though hardware only, i.e., neither processor is needed to maintain the bridged data flow. Thus, the delay caused by the bridging is primarily a direct function of FIFO size; a small FIFO produces a small delay, and a large FIFO produces a large delay. From an overall network perspective, the delay should be minimized, so preferably the smallest possible FIFOs that still provide the necessary elasticity should be used.

Figure 6:
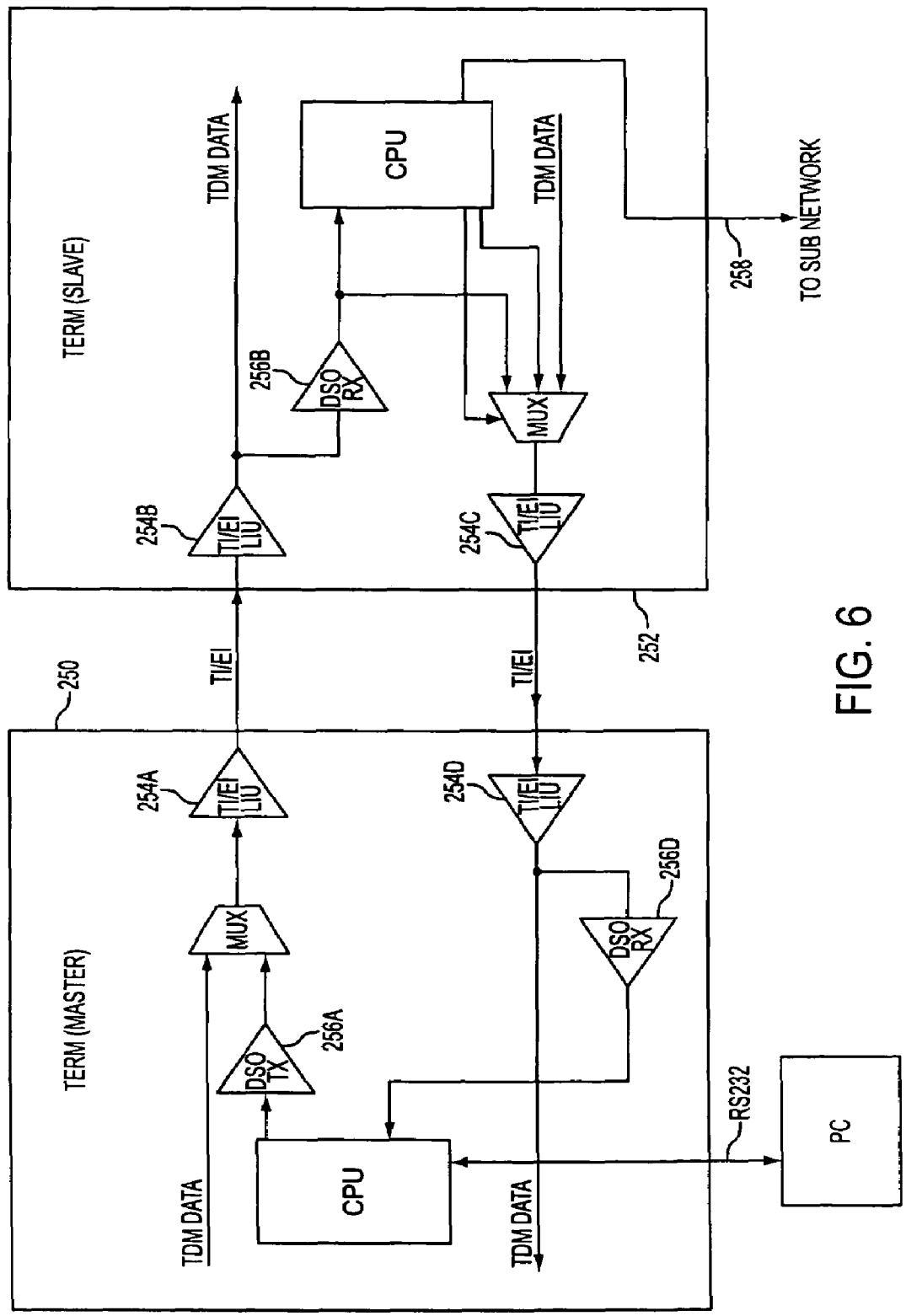
FIG. 6 shows a block diagram view of one terminal station communicating with a second terminal station; and, FIG. 7 shows a block diagram view of a drop-insert type multiplexor, including two ports.

FIG. 6 shows a block diagram view of one terminal station 250 communicating with a second terminal station 252. The first terminal station 250 functions as the master station, and the second terminal station 252 functions as the slave station. A "terminal" station is a station that occurs at the end of a communications path, and does not forward data to any other stations. The communications paths between these two stations includes a T1/E1 link from the first station 250 to the second station 252, and another T1/E1 link from the second station 252 to the first station 250. In both cases, a line interface unit 254 (hereinafter "LIU") receives the raw, incoming T1/E1 data stream and passes the buffered data stream to a T1/E1 framer 256. T1/E1 framer 256 can receive or transmit control data.

In FIG. 6, framer 256A transmits control data, and framers 256B and 256D receive control data.

The combination of the LIU 254 and the framer 256 can also generate an outgoing T1/E1 signal when given data, clock and synchronization information.

To communicate with the slave station 252, the master station 250 turns on the transmit framer 256A, and the slave station 252 receives the transmitted data at receive framer 256B. The slave station 252 waits until the master station 250 has completed transmitting, and subsequently responds to commands within the transmission by turning on the transmitter LIU 254C and transmitting response data. When the slave station 252 is not transmitting, the slave receive framer 256B is bridged to the slave transmit framer 254C, so as to create a "loop-back" condition through the slave station 252. The bridging allows the master station 250 to evaluate link circuit integrity and continuity. The master station 250 transmits messages and expects the same messages to be echoed back. Since the master station 250 is not bridged, the messages are terminated at the master station 250, thus preventing the messages from circulating around the loop more than once.

The slave station 252 can decode the received communication data and regenerate that information to a local port, and thus send the information to a station in a sub-network via a link 258 standard using communications protocol such as Ethernet, RS-232 or RS-485. Information regarding control, status, etc., from the sub-network can be transmitted to the slave station 252 via the same link 258, and the slave station 252 transmits the information to the master station 250 via the T1/E1 link.

Figure 7:
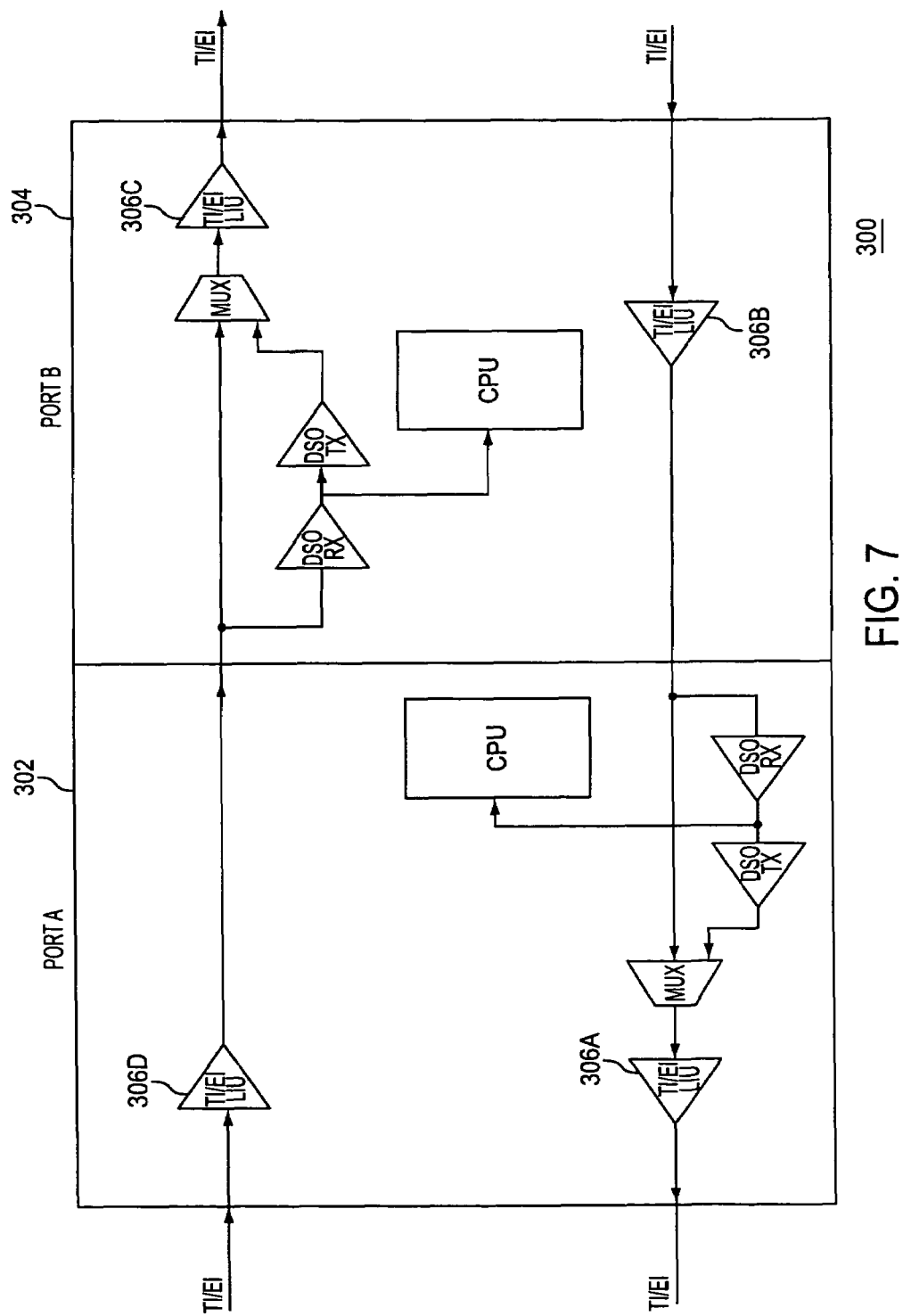

FIG. 7 shows a block diagram of a drop-insert type multiplexor 300, including two ports; port A 302 and port B 304. T1/E1 data received by port A 302 may be transmitted out on port B 304, and T1/E1 data received by port B 304 may be transmitted out on port A 302. Data can also be inserted by the multiplexor 300 into either data path. On the "A" side, the device 306A sends data out on the outgoing T1/E1 data stream, and receives information from the T1/E1 data stream from the device 306B on the "B" side. On the "B" side, the LIU 306C sends data out on the outgoing T1/E1 data stream, and receives information from the T1/E1 data stream received by the device 306D on the "A" side. If either the "A" side or the "B" side corresponds to a slave station, bridging as described herein is enabled such that the corresponding transmit device is bridged to the receive device while that station is not transmitting local data. Conversely, when local data is to be transmitted, multiplexor 300 removes the bridging, and inserts the local data into the T1/E1 data stream. One advantage to such drop-insert bridging is that the transmitted communication data multiplexed into the T1/E1 data stream does not change octet alignment when switching from bridge mode to transmit-local-data mode. This is important because it saves the downstream receiver from having to find the octet boundaries to acquire octet alignment after a switch. As described herein, the associated CPU programs the delay element to maintain receive octet alignment; the CPU always writes octet aligned data to the associated FIFO.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for transmitting and receiving one of T1 and E1 control data in a time division multiplexer (TDM) communication network, comprising:
   a master control source for providing the control data for the communication network, the communication network comprising one of a T1 system and an E1 system;
   at least one slave TDM multiplexer within the TDM communications network, the at least one slave TDM multiplexer having a plurality of associated data sources and being operative to produce a TDM signal, comprising a plurality of fixed-length frames, each of the plurality of associated data sources being represented by one of a plurality of time-slots of equal length that reoccur at a fixed length across each of the plurality of fixed-length frames, the plurality of time-slots representing respective data channels of the TDM communications network, a given slave TDM multiplexer comprising:
   a transmitter component, having an associated transmit processor, for accepting the TDM control data from the master control source and inserting the TDM control data into at least a portion of one of the plurality of fixed-length, recurrent time-slots of equal length in each frame of the plurality of frames the TDM signal; and a receiver component for extracting the TDM control data from the TDM signal and passing the TDM control data to a local processor.

2. The system of claim 1, the transmitter component comprising a first First In, First Out (FIFO) buffer that buffers incoming TDM control data and the receiver component comprising a second FIFO buffer that buffers outgoing TDM control data such that TDM control data can be relayed across the slave TDM multiplexer without synchronization by the local processor.

3. The system of claim 1, the TDM control data comprising at least one of configuration data for one of the plurality of multiplexers and status information associated with the TDM communications network.

4. The system of claim 1, further comprising a second communications network comprising a plurality of multiplexers, wherein a slave TDM multiplexer associated with the first communications network is operative to extract TDM data from a TDM signal provided by a preceding slave TDM multiplexer associated with the first communications network, transmit the extracted control data to a successive slave TDM multiplexer associated with the first communications network as part of a TDM signal, and transmit the extracted control data to a multiplexer associated with the second communications network via a secondary communications link, as to create a subnetwork.

5. The system of claim 4, wherein the secondary communications link comprises an RS-232 communications link.

6. The system of claim 1, wherein the transmitter component inserts the TDM control data into a fraction of the fixed, recurring time slots, and the receiver component extracts the TDM control data from the corresponding fraction of the time slot.

7. The system of claim 1, wherein the transmitter component inserts the TDM control data into at least two of the fixed, recurring time slots, and the receiver component extracts the TDM control data from the corresponding at least two time slots.

8. A system for transmitting and receiving time division multiplexer (TDM) control data in a time division multiplexer (TDM) communication network, comprising:

a master control source for providing the TDM control data; and a first slave TDM multiplexer within the TDM communications network that accepts the TDM control data from the master control source and inserts the TDM control data into a TDM signal;

a second slave TDM multiplexer, comprising a transmitter component having an associated transmit processor and a receiver component having an associated receive processor, that is configured to operate in a bridging mode such that the TDM signal from the first slave multiplexer is received at the receiver component, bridged to the transmitter component, and retransmitted independently of the transmit processor and the receive processor; and a third slave TDM multiplexer that receives the TDM signal from the second slave TDM multiplexer and extracts the TDM control data in the TDM signal.

9. The system of claim 8, the TDM control data comprising at least one of configuration data for one of the plurality of multiplexers and status information associated with the TDM communications network.

10. The system of claim 8, wherein the first slave TDM multiplexer is operative to produce a TDM signal comprising a plurality of fixed-length, recurrent time-slots in each frame that are allocated to respective channels associated with the TDM multiplexer, and the first slave TDM multiplexer inserts the TDM control data into at least a portion of one of the channels associated with the TDM signal such that the control data is transmitted in a recurring time slot in each frame.

11. A system according to claim 8, wherein the first slave TDM multiplexer is operative to perform a serial to parallel conversion of the TDM control data, bit shift the control data as to form at least one control data octet, and provide the at least one control data octet to a buffer.

12. A system according to claim 8, wherein the first slave TDM multiplexer is operative to buffer a plurality of control data octets from the master control source, perform a parallel to serial conversion of the control data, and insert the TDM control data into predetermined data positions within the TDM signal.

13. The system of claim 8, wherein a first TDM multiplexer operates as a master station and each of the second and third slave TDM multiplexers transmit only when stimulated by the first TDM multiplexer, and only one slave TDM multiplexer transmits at a given time.

14. The system of claim 8, the transmitting component comprising a first First In, First Out (FIFO) buffer that buffers incoming TDM control data and the receiving component comprising a second FIFO buffer that buffers outgoing TDM control data such that TDM control data can be relayed across the second slave TDM multiplexer without synchronization by the transmit processor and the receive processor.

15. A method for distributing time division multiplexer (TDM) control data within a time division multiplexing (TDM) communications network comprising a plurality of TDM multiplexers, comprising:

generating TDM control data, comprising at least one of configuration data for one of the plurality of multiplexers and status information associated with the TDM communications network, at a master control source;

receiving the TDM control data at a first TDM multiplexer;

inserting at least a portion of the received control data into a TDM signal at the first TDM multiplexer;

receiving the TDM signal at a second TDM multiplexer that is configured to operate as a repeater;

retransmitting the TDM control signal concurrently with evaluation of its content at a local processor associated with the second TDM multiplexer, such that the TDM signal is retransmitted in a substantially unaltered form regardless of its content; and extracting the TDM control data from the TDM signal at a third TDM multiplexer and providing the TDM control data to a TDM multiplexer control processor associated with the third TDM multiplexer.

16. The method of claim 15, further comprising:

buffering the TDM control data at the second TDM multiplexer, wherein the TDM control data is received at a first data rate; and transmitting to the TDM control data to a third TDM multiplexer at a second data rate that is different from the first data rate.

17. The method of claim 15, wherein inserting at least a portion of the received control data into the TDM signal comprises inserting control data into one of a plurality of fixed-length, recurrent time-slots in a given frame of the TDM signal, such that the TDM control data is transmitted on a data channel associated with the TDM signal.

18. The method of claim 15, further comprising transmitting the TDM control data received at the first TDM multiplexer to a fourth multiplexer associated with a second communications network.

19. The method of claim 15, wherein receiving the TDM control data at a first TDM multiplexer comprises communicating with the master control source via an RS-485 protocol.

* * * * *